US007818910B2

(12) United States Patent
Young

(10) Patent No.: US 7,818,910 B2
(45) Date of Patent: Oct. 26, 2010

(54) WEAPON INTEGRATED CONTROLLER

(75) Inventor: Stuart H. Young, Burke, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 487 days.

(21) Appl. No.: 10/956,592

(22) Filed: Sep. 29, 2004

(65) Prior Publication Data

US 2009/0287363 A1 Nov. 19, 2009

(51) Int. Cl.
*F41C 23/00* (2006.01)
(52) U.S. Cl. .......................... 42/71.01; 42/72; 42/106; 42/84; 89/37.05
(58) Field of Classification Search ............... 42/71.01, 42/72, 84, 106; 89/37.05
See application file for complete search history.

(56) References Cited

U.S. PATENT DOCUMENTS

| 3,868,883 | A | * | 3/1975 | Tucker | 89/1.8 |
| 3,912,197 | A | * | 10/1975 | McKown et al. | 244/3.13 |
| 4,318,330 | A | | 3/1982 | Hausenblas et al. | |
| 4,621,562 | A | * | 11/1986 | Carr et al. | 89/41.05 |
| 4,638,445 | A | | 1/1987 | Mattaboni | |
| 4,666,103 | A | * | 5/1987 | Allen | 244/3.11 |
| 4,884,137 | A | * | 11/1989 | Hanson et al. | 348/158 |
| 5,106,033 | A | * | 4/1992 | Phan | 244/3.12 |
| 5,184,009 | A | * | 2/1993 | Wright et al. | 250/227.11 |
| 5,263,396 | A | * | 11/1993 | Ladan et al. | 89/1.11 |
| 5,590,484 | A | | 1/1997 | Mooney et al. | |
| 5,605,505 | A | * | 2/1997 | Han | 463/39 |
| 5,648,632 | A | | 7/1997 | Becker et al. | |
| 5,648,897 | A | * | 7/1997 | Johnson et al. | 700/83 |
| 5,669,174 | A | * | 9/1997 | Teetzel | 42/115 |
| 5,788,178 | A | * | 8/1998 | Barrett, Jr. | 244/3.11 |
| 5,822,905 | A | * | 10/1998 | Teetzel | 42/117 |
| 5,867,817 | A | | 2/1999 | Catallo et al. | |
| 6,144,367 | A | * | 11/2000 | Berstis | 345/158 |
| 6,269,730 | B1 | * | 8/2001 | Hawkes et al. | 89/41.05 |
| 6,311,682 | B1 | * | 11/2001 | Rice et al. | 124/71 |
| 6,377,875 | B1 | * | 4/2002 | Schwaerzler | 701/2 |
| 6,422,507 | B1 | * | 7/2002 | Lipeles | 244/3.13 |
| 6,523,629 | B1 | | 2/2003 | Buttz et al. | |
| 6,545,587 | B1 | * | 4/2003 | Hatakeyama et al. | 340/3.31 |
| 6,569,019 | B2 | | 5/2003 | Cochran | |
| 6,666,746 | B2 | * | 12/2003 | Aldred et al. | 446/454 |
| 6,893,320 | B2 | * | 5/2005 | Caiozza | 446/456 |
| 6,931,775 | B2 | * | 8/2005 | Burnett | 42/72 |
| 7,180,665 | B2 | * | 2/2007 | Daniel et al. | 359/461 |
| 2004/0198336 | A1 | * | 10/2004 | Jancic et al. | 455/420 |
| 2005/0134716 | A1 | | 6/2005 | Vice | |
| 2008/0010890 | A1 | | 1/2008 | Vice et al. | |
| 2008/0063400 | A1 | | 3/2008 | Hudson et al. | |

* cited by examiner

*Primary Examiner*—Michelle Clement
(74) *Attorney, Agent, or Firm*—William W. Randolph; Richard A. Morgan; Christos S. Kyriako

(57) ABSTRACT

The present disclosures are systems, apparatus and methods for communicating with a robot via a weapon. In one embodiment, the weapon comprises a barrel, a receiver assembly, a handgrip, and a first controller. The receiver assembly is coupled to an end of the barrel and to the handgrip. The first controller is integrated into the handgrip and inputs a first controller signal to a processing device. A transmitter receives a processing signal from the processing device according to the first controller signal. Preferably, the transmitter sends the processing signal to a robot, which responds accordingly to the received processing signal.

23 Claims, 5 Drawing Sheets

WEAPON INTEGRATED CONTROLLER

GOVERNMENT INTEREST

The invention described herein may be manufactured, used, and licensed by or for the United States Government.

BACKGROUND

1. Technical Field

The present disclosure relates to weapons, more particularly, the disclosure relates to a weapon that is integrated with a controller for controlling a robot.

2. Description of the Related Art

Advances in technology have allowed robots, such as unmanned aerial vehicles and unmanned ground vehicles, to be used in military combative situations. The robots have at least one controller that controls the direction of the robots and other devices, such as video cameras, thermal detectors, etc., mounted on the robots. These robots can decrease the number of casualties that occurs during military combats. For example, the unmanned ground vehicle, such as Packbots™, can be used to view inside a building. The Packbots™ can be thrown inside the building through a window and they can be controlled at a place remote from the building to see what is inside the building before sending in soldiers. In another example, the unmanned aerial vehicle can be used to scan or survey a remote area away from the soldiers. The information gathered from the unmanned aircraft vehicle can help determine the soldiers next action. Currently, the robots are controlled by at least one controller that is separate from the soldiers' weapons. The controller is another item that the soldiers carry. It adds substantial weight and requires the soldiers to disengage their hands from their weapons in order for the soldiers to operate the controller.

From the above, it can be appreciated that it would be desirable to have systems apparatus and methods for communicating with a robot via a weapon that is integrated with a controller.

SUMMARY

The present disclosures are systems, apparatus and methods for communicating with a robot via a weapon. In one embodiment, the weapon comprises a barrel, a receiver assembly, a handgrip, and a first controller. The receiver assembly is coupled to an end of the barrel and to the handgrip. The first controller is integrated into the handgrip and inputs a first controller signal to a processing device. A transmitter receives a processing signal from the processing device in accordance to the first controller signal. In a preferred embodiment, the transmitter sends the processing signal to a robot that responds to the received processing signal.

In another embodiment, a system that communicates to a robot comprises a weapon that includes a barrel, a receiver assembly, a handgrip and a first controller. The receiver assembly is coupled to an end of the barrel and to the handgrip. The first controller is integrated into the handgrip and inputs a first controller signal to a processing device. A transmitter receives a processing signal from the processing device in accordance to the first controller signal. In a preferred embodiment, the transmitter sends the processing signal to a robot, which responds accordingly to the received processing signal. The system could further comprise a headsup display, microphone, personal digital assistant, tablet display and dataglove.

The invention can also be construed as providing a method for communicating with a robot via a weapon. The method comprises establishing wireless communication with the robot, inputting a command via a controller integrated with the weapon, and transmitting a command signal based on the inputted command. The robot receives the transmitted command signal and responds based upon the command signal.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are systems, apparatus, and methods to which a controller can be integrated into a weapon for communicating with a robot. In particular, the weapon includes a controller that is integrated into a handgrip of the weapon. The controller provides a control signal to a processing device that instructs a transmitter to send the control signal to the robot. The robot receives the control signal from the controller and responds accordingly. An exemplary scenario of using a weapon that is integrated with a controller is first discussed with reference to the figures. After the exemplary scenario has been described, an exemplary apparatus of a weapon that communicates to a robot is described. Although the apparatus are described in detail, the apparatus are provided for purposes of illustration only and various modifications are feasible. After an exemplary apparatus have been described, examples of operations are provided to explain the manner in which a weapon communicates with a robot.

Figure 1:
FIG. 1 illustrates an exemplary scenario of a soldier using a weapon that is integrated with a controller to communicate with a robot.

Referring now in more detail to the figures in which like reference numerals identify corresponding parts, FIG. 1 illustrates an exemplary scenario of a soldier using a weapon that is integrated with a controller to communicate with a robot. As indicated in this figure, the soldier 70 is holding a weapon 1 that is integrated with a controller to communicate with a robot 80. The soldier 70 can communicate with the robot 80 without disengaging his hands from the weapon 1.

Figure 2:
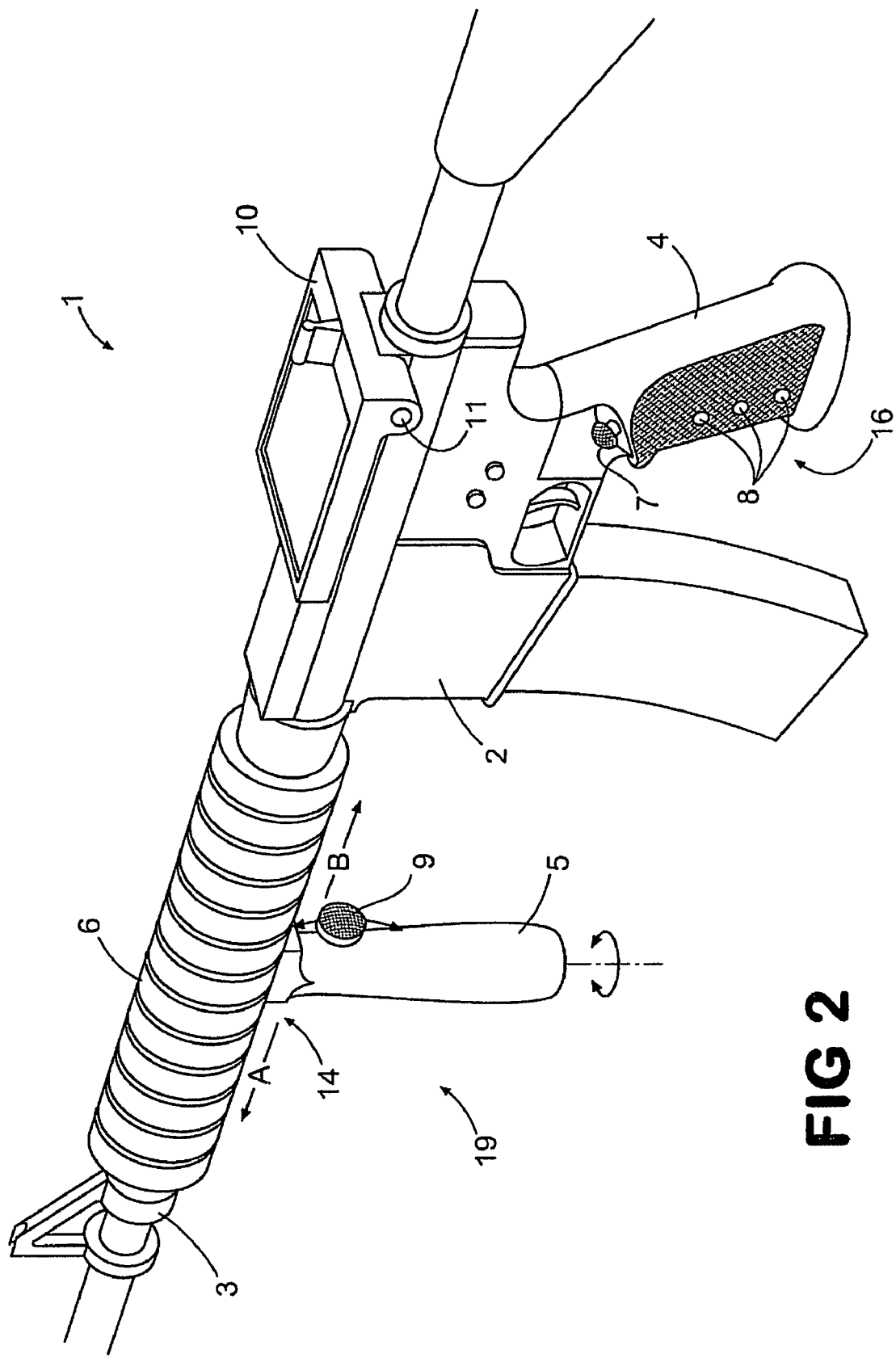
FIG. 2 is a perspective view of an exemplary embodiment of a weapon as shown in FIG. 1.

FIG. 2 is a perspective view of an exemplary embodiment of a weapon as shown in FIG. 1. Referring to FIG. 2, the weapon 1 generally comprises a receiver assembly 2, a barrel 3, a handgrip 4, and a first controller 16 that is integrated into the weapon. The first controller comprises a joystick 7 and buttons 8. The robot is generally a device that has a processing device to process signals that are received from the weapon 1.

The weapon 1 further includes an LCD screen 10, which is coupled to the receiver assembly 2 via pin 11. The LCD screen 10 can flip up or down about the pin 11 in which the LCD screen can lie flat on top of the receiver assembly so that the soldier 70 can aim at his target. The LCD screen can adjust the angle of the LCD screen about pin 11 to be seen by the soldier. The LCD screen can display video images taken from a robot. In an alternative embodiment, the video image can be displayed in an aimpoint/thermal/visible weapon sight that is capable of displaying video images.

The handgrip is integrated with the joystick 7 that can control the movement of the robot, e.g., left/right or backward/forward. In an alternative embodiment, the joystick 7 can be used as a computer mouse that controls a pointer in a graphical user interface of a computing device. The buttons 8 can switch the controller from operating with the robot to other devices mounted on the robot or to a computing device mounted on the soldier. For example, the user can push one of the buttons 8 to switch controlling the robot to controlling a video imaging device mounted on the robot. The buttons 8 can be used to control the video imaging device to zoom in and out of the graphical image. The joystick 7 can control the movement of the video imaging device so that the soldier can direct the video imaging device to where he would like to see.

In another example, the soldier can push one of the buttons 8 to switch to operating a computing device mounted on the soldier. The joystick 7 can be used to move the mouse on the graphical user interface of the computing device and the buttons 8 can further operate to "click" on an object on the graphical user interface. The computing device may have a navigation system in which the soldier 70 can operate the robot using the navigational system. The soldier uses the joystick 7 and buttons 8 similar to a mouse to select and to display a geographical layout of the region on the weapon display 10. In the case of an unmanned aerial vehicle (UAV), the soldier can select the region, which commands the UAV to survey and display images of the area. The first controller can further select menus in the navigational system to instruct the UAV to hover at a particular height above that region.

The weapon 1 further includes a rail interface system 6 that is coupled to the barrel 3. The rail interface system 6 is coupled to a second controller 19, which comprises rocker button 9 and handle 5. The second controller 19 can control the movement and zooming of a video imaging device mounted on a robot. This enables the soldier 70 to control the robot 80 and at the same time, control the video imaging device. The handle 5 can be inserted through a slot 14 of the rail interface system 6. The slot 14 allows the handle 5 to slide in directions A and B along the slot 14 of the rail interface system 6. The soldier 70 can slide the handle 5 along slot 14 in directions A and B to instruct the imaging device to zoom in and out of the desired image. The rocker button 9 allows the soldier to tilt the imaging device on the robot up or down. The handle 5 can be twisted to control the video imaging device to rotate left or right about the robot.

It should be noted that the foregrip of the weapon could be coupled to another controller with at least some of the features of the first and second controllers. In fact, the controller on the foregrip can include a joystick and one or more buttons that are similar to the first controller of the pistol grip.

Figure 3:
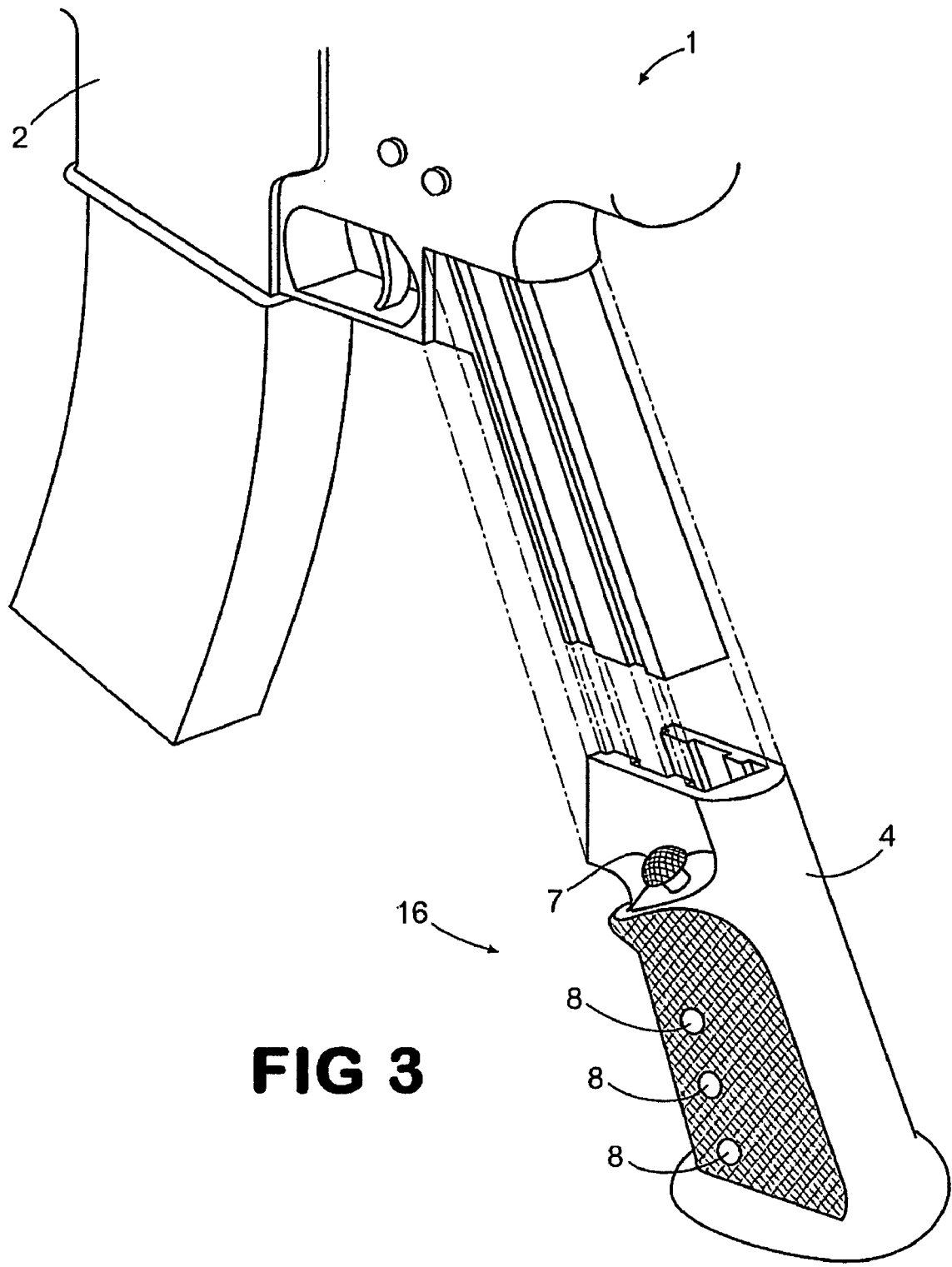
FIG. 3 is a perspective view of an exemplary embodiment of a handgrip of a weapon as shown in FIG. 2.

FIG. 3 is a perspective view of an exemplary embodiment of a handgrip of a weapon as shown in FIG. 2. The handgrip 4 can be replaceable and can have different grip size or can be replaced with a handgrip that is not integrated with a controller. The handgrip 4 can include a rocker instead of a joystick. It should be noted that the controllers are not limited to joystick 7, rocker 9, and buttons 8, but are generally a device that receives mechanical inputs, e.g., pushing the buttons or moving the joysticks, from a soldier to communicate with the robot.

It should be noted that the weapon 1 described in FIGS. 1-3 can be networked into a personal area network (PAN). The PAN can comprise a microphone speech control, a headsup display, a wireless personal digital assistant, a flexible tablet display, a dataglove control, and the weapon 1. The headsup display is another option to the LCD screen 10 for displaying video images and can be integrated into the soldier's helmet. The headsup display is part of the helmet's protective eye shield that protects the soldier's eyes and can display video images from the robots on the soldier's headsup display/protective eye shield.

The microphone speech control is typically used for more intelligent robots capable of some autonomous navigation. The soldier can issue oral commands to the robot using a microphone for voice communication via a radio. The wireless PDA can be mounted on the soldier's wrist and can be used for displaying video images from the robots. The PDA can be programmed to include the feature of a way-point navigation for robots that are capable of such features. The dataglove control is worn on the soldier's hands and has a mechanical input and tactile feedback device for sending commands to the robots. For example, the soldier can move his hand forward or away from his body to signal the robot to move forward, backward, left or right. The dataglove control can also be used to control the video imaging device mounted on the robot. The flexible tablet display has similar feature to the PDA as explained earlier. However, the flexible tablet display has a larger display and is more suited for more intelligent robots or a team of semi-autonomous robots.

Figure 4:
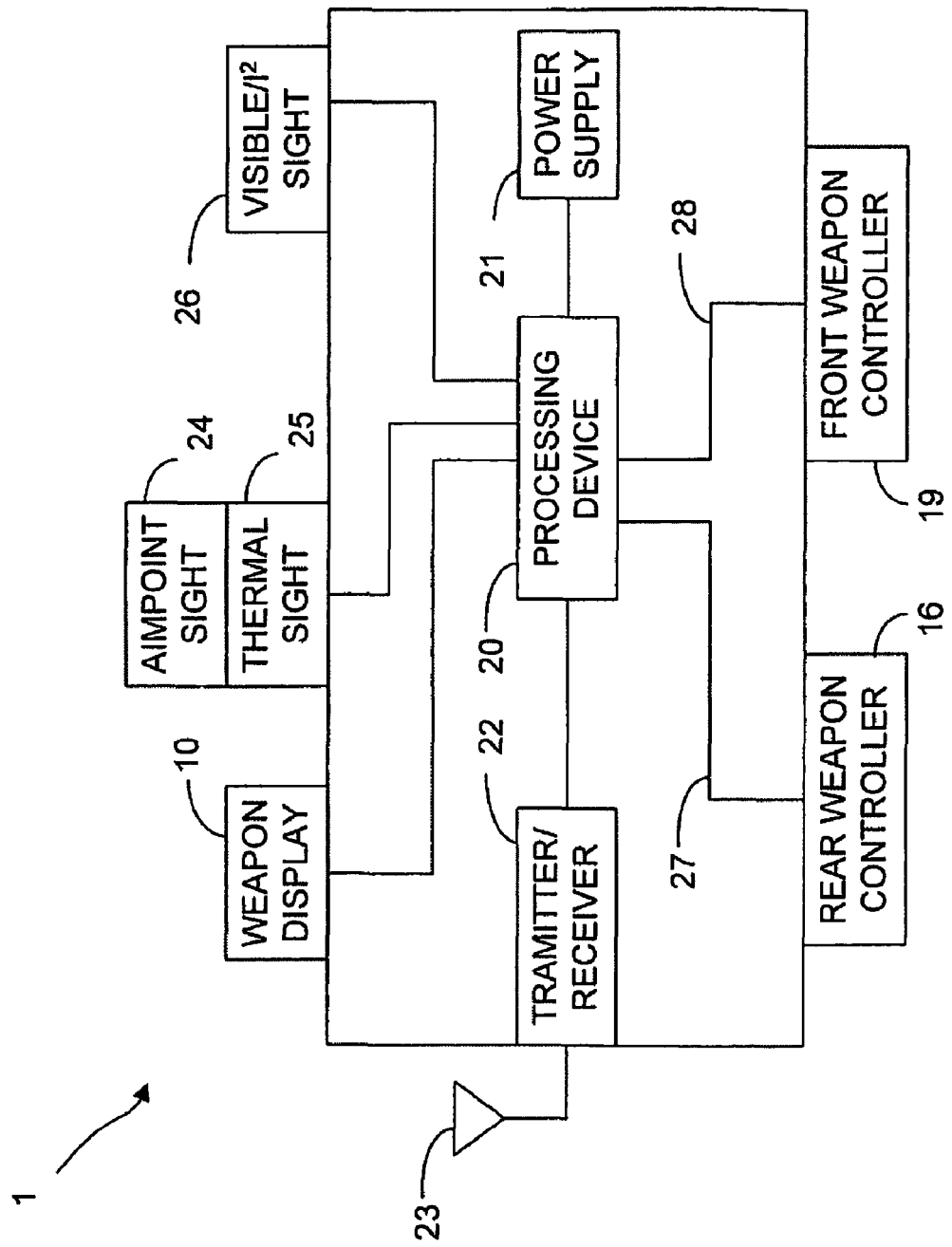
FIG. 4 is an exemplary schematic of a weapon as shown in FIGS. 1-3.

FIG. 4 is an exemplary schematic of a weapon as shown in FIGS. 1-3. The weapon 1 includes a power supply 21 that powers the electronic components of the weapon. The weapon 1 further includes a rear weapon controller 16 and a front weapon controller 19. The rear weapon controller for 16 is electrically coupled to a processing device 20 via line 27. The front weapon controller 19 is electrically coupled to the processing device 20 via line 28. The front and rear controller can either control a robot or a video imaging device mounted on the robot. The front and rear controller can further control a mouse on a computing device mounted on the soldier, such as a PDA or a flexible tablet display.

Once the processing device 20 receives input from the controllers, the processing device sends the signal to a receiver/transmitter 22, which transmits the inputted signal from the controller to the robot via the antenna 23. The weapon 1 can receive information from the robot via the transmitter/receiver 22. The signals from the robot are preferably video imaging signals that are captured from a video imaging device. The transmitter/receiver 22 sends the video imaging signals to the processing device 20, which then displays the video imaging signals on the weapon display 10. The weapon display can further display geographical layout of a navigation system, which can instruct the robot to navigate itself to that direction. The weapon display can further display a graphical user interface that the soldier can use to communicate with the robot or imaging device. The processing device is further coupled to the aimpoint sight 24, thermal sight 25, and visible/$I^2$ sight 26.

It should be noted that the processing device 20 in FIG. 4 can be electrically coupled to a personal area network (PAN), as described earlier. The processing device can be integrated into the PAN, which may comprise a heads p display, wireless PDA, dataglove control, microphone speech control, and flexible tablet display. These components can allow the soldier to communicate with the robot in a way that is most comfortable and suitable to the soldier during combat.

Figure 5:
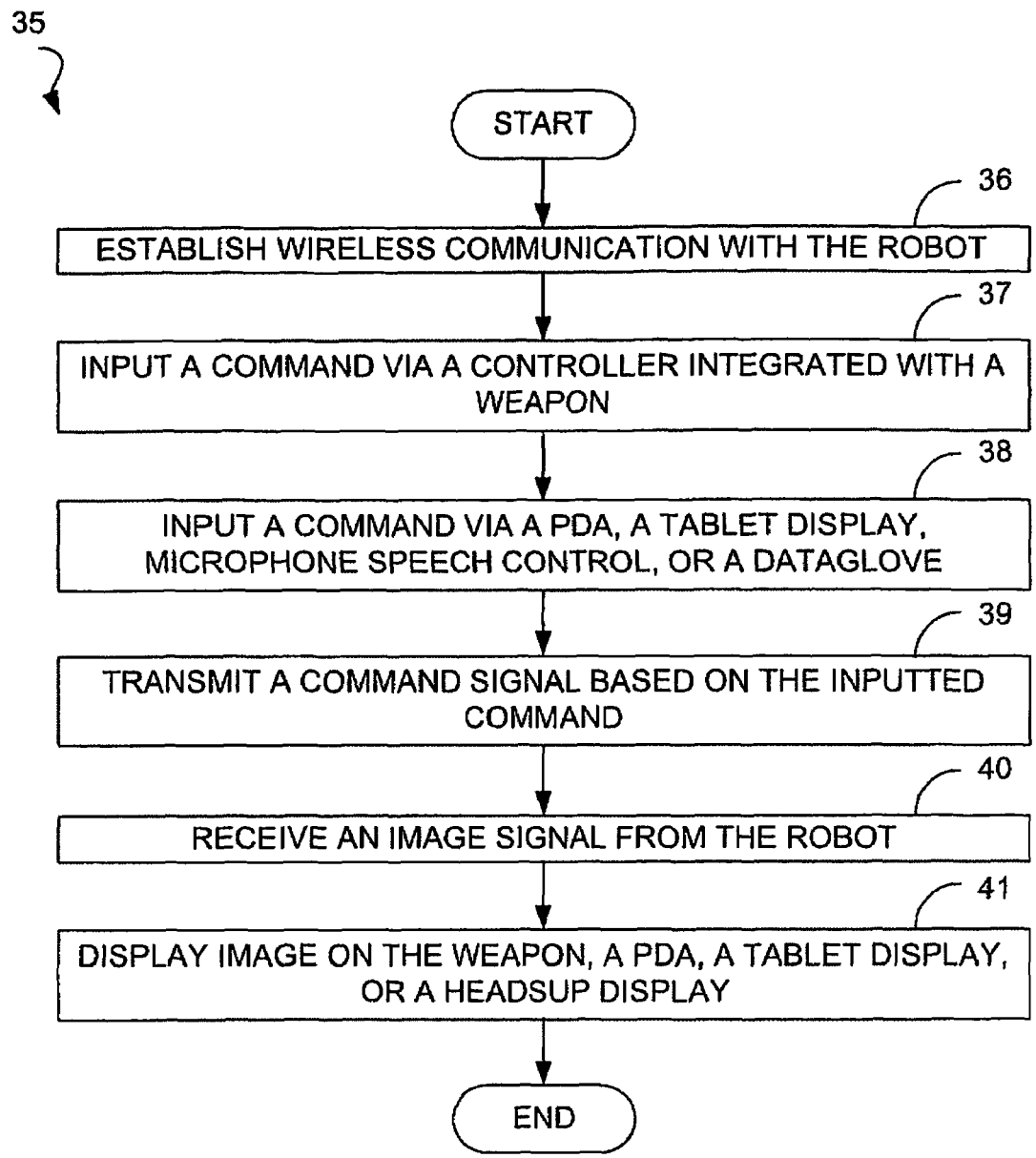
FIG. 5 illustrates an exemplary embodiment of a method for communicating with a robot via a weapon as shown in FIGS. 1-3.

FIG. 5 illustrates an exemplary embodiment of a method for communicating with a robot via a weapon as shown in FIGS. 1-3. Beginning with block 36, the method 35 comprises establishing a wireless communication with a robot. In block 37, a user inputs a command via a controller that is integrated with the weapon to control the robot. In block 38, the robot can further be controlled by inputting a command via one of a personal digital assistant, a tablet display, and a dataglove. In block 39, the weapon transmits a command signal based on the command inputted by the user via the controller. The robot receives the transmitted command signal and responds based upon the transmitted command signal. The transmitted command signal can control the robot and an imaging device mounted on the robot. In block 40, the weapon receives an image signal from the robot. In block 41, the weapon displays an image based on the image signal on one of a weapon display, a personal digital assistant, a tablet display, and a heads-up display.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A weapon comprising:
   a barrel;
   a receiver assembly coupled to the barrel;
   a first handgrip coupled to the receiver assembly;
   a first controller that provides a first control signal, the first controller integrated into the first handgrip;
   a second handgrip;
   a second controller that provides a second control signal, the second controller integrated into the second handgrip;
   a processing device that receives the first control signal from the first controller and the second control signal from the second controller; and
   a transmitter that receives a processing signal from the processing device in accordance with the first control signal and the second control signal.

2. The weapon as defined in claim 1 designed and adapted so that a soldier holding the weapon with a first hand on the first grip and a second hand on the second grip can operate the first controller with the first hand and the second controller with the second hand without disengaging the first hand the second hand from the weapon.

3. The weapon as defined in claim 1, wherein the transmitter sends the processing signal to a robot, wherein the robot is a device that receives the transmitted signal from the transmitter and responds to the transmitted signal.

4. The weapon as defined in claim 1, further comprising a display coupled to the receiver assembly and electrically coupled to the processing device.

5. The weapon as defined in claim 4, wherein the display is capable of displaying one of video images from a robot, a graphic user interface, and a geographical layout for a navigational system.

6. The weapon as defined in claim 1, wherein the transmitter transmits a command signal to a robot that controls the direction of the robot, further wherein the robot is an unmanned aerial vehicle or an unmanned ground vehicle that receives the command signal transmitted from the transmitter and responds to the command signal.

7. A system that communicates to a robot via a weapon, the system comprising:
   a robot and
   a weapon comprising:
   a barrel;
   a receiver assembly coupled to an end of the barrel;
   a first handgrip coupled to the receiver assembly;
   a first controller that provides a first control signal, the first controller integrated into the first handgrip;
   a second handgrip;
   a second controller capable of providing a second control signal, the second controller integrated into the second handgrip; and
   a transmitter that receives a processing signal in accordance with the first controller signal and the second controller signal and then transmits a command signal to the robot wherein the robot responds to the command signal.

8. The system as defined in claim 7, wherein the robot receives the processing signal from the transmitter, the robot being a device that receives the transmitted signal from the transmitter and processes the received signal.

9. The system as defined in claim 7, wherein the robot transmits robot signals to the weapon, the weapon further comprising a receiver that receives the robot signals from the robot.

10. The weapon as defined in claim 7, wherein the second handgrip is foregrip.

11. The system as defined in claim 7, further comprising a display coupled to the receiver assembly and electrically coupled to the processing device.

12. The system as defined in claim 11, wherein the command signal controls left and right movement of the robot or backward and forward movement of the robot.

13. The system as defined in claim 7 designed and adapted so that a soldier holding the weapon with a first hand on the first grip and a second hand on the second grip can operate the first controller with the first hand and the second controller with the second hand without disengaging the first hand the second hand from the weapon.

14. The system as defined in claim 7, further comprising a headsup display that displays one of a video image from a robot, a graphic user interface, and a geographical layout for a navigational system.

15. The system as defined in claim 7, further comprising a microphone that has speech control capabilities that can control the robot.

16. The system as defined in claim 7, further comprising a display that displays one of a graphic user interface, a video image from the robot, and a geographical layout for a navigation system.

17. A system that communicates to a robot via a weapon, the system comprising:
   a robot and
   a weapon comprising:
   a barrel;
   a receiver assembly coupled to an end of the barrel;
   a first handgrip coupled to the receiver assembly;
   a first controller capable of providing a first control signal, the first controller integrated into the first handgrip;
   a second handgrip that is a foregrip;
   a second controller capable of providing a second control signal, the second controller integrated into the second handgrip;

a processing device capable of receiving a first controller signal from the first controller and a second controller signal from the second controller; and a transmitter that receives a processing signal in accordance with the first controller signal and the second controller signal further comprising a display that displays one of a graphic user interface, a video image from the robot, and a geographical layout for a navigational system.

18. The system as defined in claim 7, further comprising a data glove that controls the robot.

19. The system as defined in claim 7, further comprising a personal area network that couples the weapon with one of a heads-up display, a microphone, a personal digial assistant, a tablet display, and a data glove.

20. The weapon as defined in claim 2, wherein one of the first controller and the second controller operates a computing device that is designed and adapted to be mounted on a soldier.

21. The weapon as defined in claim 2, wherein the second handgrip is a foregrip.

22. The weapon as defined in claim 1, wherein the second controller comprises a handle that can be twisted to control a video imaging device mounted on a robot.

23. The weapon as defined in claim 1, wherein one of the first controller and the second controller controls the direction of the robot and the other of the first controller and the second controller controls a device mounted on the robot.

* * * * *